(12) United States Patent
Nishino et al.

(10) Patent No.: US 7,626,630 B2
(45) Date of Patent: Dec. 1, 2009

(54) PORTABLE INFORMATION TERMINAL EQUIPPED WITH CAMERA

(75) Inventors: Masaaki Nishino, Tokyo (JP);
Masakatsu Takizawa, Tokyo (JP);
Norihisa Mitsuyu, Tokyo (JP); Shuji Yamaguchi, Tokyo (JP); Satoshi Machida, Tokyo (JP)

(73) Assignee: Crescent Moon, LLC, San Diego, CA (US)

( * ) Notice: Subject to any disclaimer, the term of this patent is extended or adjusted under 35 U.S.C. 154(b) by 562 days.

(21) Appl. No.: 11/338,769

(22) Filed: Jan. 25, 2006

(65) Prior Publication Data

US 2006/0125946 A1    Jun. 15, 2006

Related U.S. Application Data

(62) Division of application No. 09/733,033, filed on Dec. 11, 2000, now Pat. No. 7,046,287.

(30) Foreign Application Priority Data

Dec. 24, 1999  (JP)  ................................. 11-367810
Dec. 24, 1999  (JP)  ................................. 11-367811
Dec. 24, 1999  (JP)  ................................. 11-367812

(51) Int. Cl.
*H04N 5/225*     (2006.01)
(52) U.S. Cl. .................................. 348/333.06; 348/375
(58) Field of Classification Search ............ 348/333.01, 348/333.06, 333.07, 373–375
See application file for complete search history.

(56) References Cited

U.S. PATENT DOCUMENTS

| 5,363,089 | A |   | 11/1994 | Goldenberg |
| 5,491,507 | A |   | 2/1996 | Umezawa et al. |
| 5,550,754 | A |   | 8/1996 | McNelley et al. |
| 5,896,600 | A |   | 4/1999 | Mills |
| 5,943,603 | A |   | 8/1999 | Parulski et al. |
| 6,067,116 | A | * | 5/2000 | Yamano et al. .............. 348/372 |
| 6,069,648 | A |   | 5/2000 | Suso et al. |
| 6,082,691 | A | * | 7/2000 | Moriyasu .................. 248/274.1 |
| 6,308,084 | B1 |  | 10/2001 | Londa |
| 6,441,854 | B2 |  | 8/2002 | Fellegara et al. |
| 6,466,202 | B1 |  | 10/2002 | Suso et al. |

(Continued)

FOREIGN PATENT DOCUMENTS

JP       5-122575 A       5/1993

(Continued)

*Primary Examiner*—Tuan V Ho
(74) *Attorney, Agent, or Firm*—DLA Piper LLP (US)

(57) ABSTRACT

The information terminal body may be designed to foldably pivot a pair of flat cases each having a display unit through a hinge which is equipped with a photographing optical system for the camera function unit of which optical axis of lens is perpendicular to an axial center of the hinge. The display units display information from communication channels and images taken in by the camera. The cases may have the display units such that the display units face outside in a folded state. At least one of the two display units may be a finder for photographers, while the other may be a finder for the subject persons. The terminal is equipped with a shutter button and a terminal operation button. The terminal operation button works also as a shutter button. The information terminal is also equipped with a viewfinder for the camera lens system.

4 Claims, 11 Drawing Sheets

U.S. PATENT DOCUMENTS

| | | |
|---|---|---|
| 6,510,325 B1 | 1/2003 | Mack, II et al. |
| 6,628,333 B1 | 9/2003 | Gowda et al. |
| 6,697,117 B1 | 2/2004 | Park |
| 7,046,286 B1 * | 5/2006 | Kobayashi et al. ..... 348/333.06 |

FOREIGN PATENT DOCUMENTS

| | | |
|---|---|---|
| JP | 06-133081 A | 5/1994 |
| JP | 06-150069 A | 5/1994 |
| JP | 3011657 | 3/1995 |
| JP | 8-022343 A | 1/1996 |
| JP | 10-051665 A | 2/1998 |
| JP | 2587259 | 10/1998 |
| JP | 10-313452 A | 11/1998 |
| JP | 10-340073 | 12/1998 |
| JP | 11-069214 A | 3/1999 |
| JP | 11-069214 A | 3/1999 |
| JP | 11-126126 | 5/1999 |
| JP | 11-136554 A | 5/1999 |
| JP | 11-163996 | 6/1999 |
| JP | 11-205761 A | 7/1999 |
| JP | 2000-078254 | 3/2000 |
| JP | 2000-253113 A | 9/2000 |
| KR | 1999-024567 | 6/1999 |

\* cited by examiner

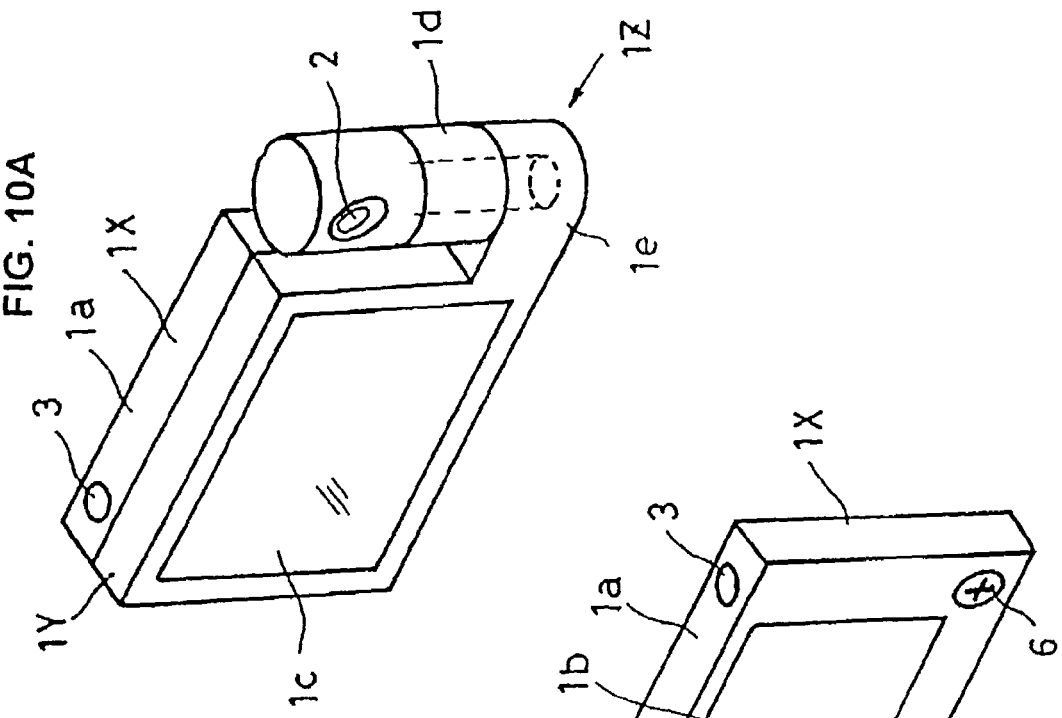
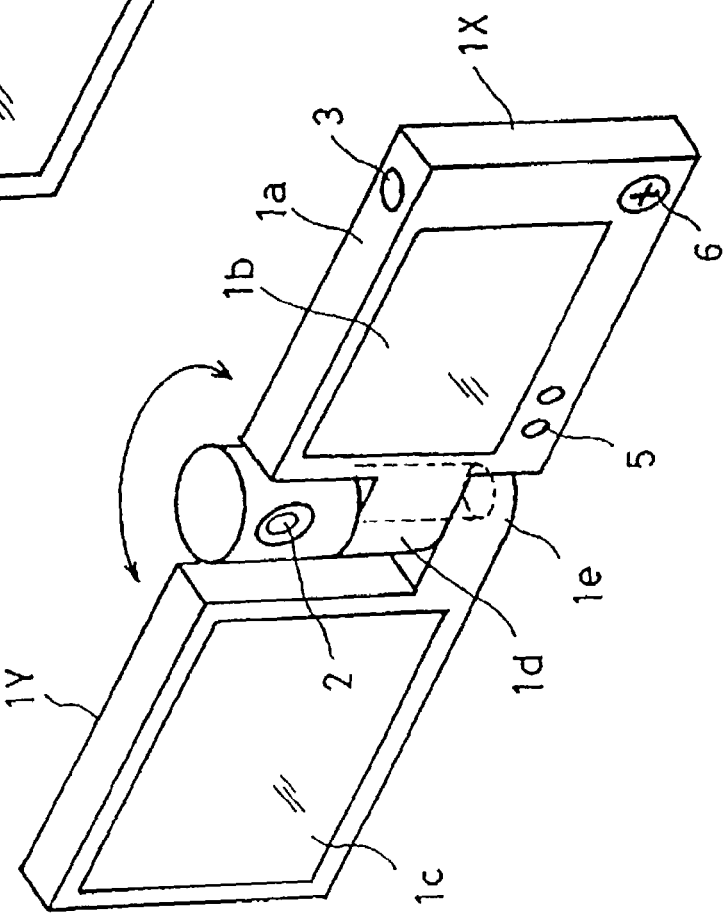
FIG. 10A
FIG. 10B

PORTABLE INFORMATION TERMINAL EQUIPPED WITH CAMERA

CROSS-REFERENCE TO RELATED PATENT APPLICATIONS

This application is a division of application Ser. No. 09/733,033, filed Dec. 11, 2000, now pending, and based on Japanese Patent Applications Nos. 11-367810, 11-367811, and 11-367812, all filed Dec. 24, 1999 by Masaaki Nishino, Masakatsu Takizawa, Norihisa Mitsuyu, Shuji Yamaguchi and Satoshi Machida. This application claims only subject matter disclosed in the parent application and therefore presents no new matter.

BACKGROUND OF THE INVENTION

1. Technical Field of the Invention

The present invention relates to a portable information terminal equipped with camera which is applied to a portable television telephone and other general purposes.

2. Description of the Prior Art

Conventional portable information terminal with camera of this type is provided with a camera function unit which is arranged on an information terminal body, and a display unit is used as a finder in a photographing optical system of the camera function unit. In this manner, when the portable information terminal is equipped with the camera and used as a digital camera, it is desired that the portable information terminal has operability equal to that of a normal camera and consumes less electric power.

Further, in a portable information terminal with camera of this type, an information terminal body is equipped with a camera function unit, and a shutter button arranged in a photographing optical system of the camera function unit is arranged on the information terminal body. In this manner, when the portable information terminal is equipped with the camera, high operability equal to that of a normal camera and the operability of the camera when the portable information terminal is used as a portable information terminal are desirably compatible. In general, in order to secure the operability of the camera, it may be effective that the position of the shutter is arranged at a shoulder portion of a case.

Furthermore, as a portable information terminal with camera of this type, for example, devices disclosed in JP 8-22343 (1996) and JP 11-69214 (1999) are known. In particular, in the device disclosed in JP 11-69214 (1999), an information terminal is equipped with a camera function unit, and the information terminal body is designed to foldably pivot a pair of flat cases each having a display unit through a hinge portion, and the hinge portion has a photographing optical system of the camera function unit, having a lens opening in a direction perpendicular to the axial center of the hinge portion. In this case, when the portable information terminal is equipped with the camera, the photographing optical system of the camera must be attached to an end of the device body for the sake of a screen arrangement. For this reason, the hinge portion for folding the cases of the device is designed to form a lens opening for the optical system. In addition, since the lens opening can be headed in a free direction ranged to some extent, the cases can be switched from a folded state to open states of several steps, and the usage of the portable information terminal is designed in various modes.

However, a power for screen display must be switched on to perform photographing while the display unit of the portable information terminal is used as a finder. For this reason, a power consumption increases, and the portable information terminal can not be used for many hours. In addition, when a subject is photographed without using display finder, the photographing cannot be performed at a good camera angle.

Further, when the portable information terminal is operated as a portable information terminal, and when a shutter is arranged at the shoulder portion of the case, every camera photographing, the device must be changed in holding state such that the shutter operation can be easily performed, and a finger placed on the terminal operation button must be moved to the position of the shutter arranged at the shoulder of the case. This action is a considerable disadvantage to operability. In addition, when the display screen is used as a vertically long screen or a horizontally long screen, if a shutter release button is arranged at a convenient position, the operability is improved. Therefore, on the operations obtained when the portable information terminal is used as a camera and a portable information terminal, the shutter must be always located at a proper position where the shutter does not degrade the operability. However, the increase in the number of shutter release buttons must be avoided because the cost increases by increasing the number of parts and because the number of times of action that a user changes her/his finger position cannot be reduced by increasing the number of shutter release buttons.

Furthermore, when this portable information terminal equipped with camera is used in video recording, the display unit (liquid-crystal display unit) display, for a photographer, a subject image by the lens. Therefore, the subject person can not know the present camera angle. This is because the displayed image cannot be seen from the subject side.

SUMMARY OF THE INVENTION

An object of the present invention is to provide a portable information terminal with camera which is equipped with a viewfinder corresponding to a photographing optical system of a camera function unit independently of a display unit, used as a viewfinder, for an information terminal when the portable information terminal is used in a photographing mode of a camera, which does not degrade the operability of the camera, which suppresses a power consumption, and which can be used for many hours.

Another object of the present invention is to provide a portable information terminal with camera which can always acquire proper and comfortable operability of a camera without increasing the number of parts and complication of structure.

Still another object of the present invention is to provide a portable information terminal with camera including an information terminal body having display units arranged in a pair of cases folded through a hinge portion, wherein the portable information terminal is designed such that photographing can be performed while an image is also checked from a subject side by effectively using the two display units.

There is provided a portable information terminal with camera in which an information terminal body is equipped with a camera function unit, and a display unit of the information terminal is used as a viewfinder in a photographing optical system of the camera function unit, characterized in that the information terminal body is equipped with a viewfinder for the photographing optical system such that the viewfinder is adjusted to a direction of an optical lens of the photographing optical system. The viewfinder may be arranged in the information terminal body such that the viewfinder can be retracted in the information terminal body. The information terminal body may be designed to foldably pivot a pair of flat cases at least one of which has a display unit through a hinge portion, and the hinge portion is preferably equipped with the photographing optical system of the camera function unit and the viewfinder corresponding to the photographing optical system Further, there is provided a portable information terminal with camera in which an information terminal body is equipped with a camera function unit, and an operation button for a shutter arranged in the photographing optical system is arranged on the information terminal body, characterized in that the same function as that of the operation button for the shutter is set in one function operation of a terminal operation button arranged on the information terminal body. The information terminal body may be designed to foldably pivot a pair of flat cases at least one of which has a display unit through a hinge portion, and it is practically preferable that the hinge portion is equipped with the photographing optical system of the camera function unit. It is effective that the terminal operation button is a scroll button related to the display unit of the information terminal body, it is effective that the scroll button has a vertically pressing function, and the function is caused to correspond to the function of the operation button for the shutter, and it is effective that the terminal operation button causes one function operation to correspond to the function of the operation button for the shutter by function mode switching on the information terminal body side.

Furthermore, there is provided a portable information terminal with camera in which an information terminal body is equipped with a camera function unit, the information terminal body is designed to foldably pivot a pair of flat cases each having a display unit through a hinge portion, and the hinge portion is equipped with a photographing optical system for the camera function unit having a lens opening in a direction perpendicular to an axial center of the hinge portion, characterized in that the cases have the display units such that the display units face outside in a folded state. The hinge portion may have a structure in which the cases are pivoted by two parallel shafts with respect to a housing equipped with the photographing optical system, the display units are designed to select two states such that the display units face inside of the information terminal body in a folded state and face outside in a developed state, and the display units can be selected and switched with respect to a normal image such that one of the display units facing the subject side displays an inverted image through image inversion means to display the horizontal inverted image of a photographed image. The display units arranged in the cases may have use modes which can be switched such that the cases are opposite to each other in the folded state of the cases and face the same side when the display units are developed about the hinge portion at 180°, and a housing equipped with the photographing optical system for the camera function unit is pivotally supported by the two parallel shafts, is rotated at 360° through the cases such that the display units can be located inside or outside the information terminal in a folded state, and can be developed such that the display units can be located on the same side in the middle of the rotation. The information terminal body is equipped with a camera function unit, the information terminal body has two display units and is equipped with a photographing optical system, having a lens opening, for the camera function unit, and one of the display units is designed to be used as a viewfinder of the camera.

According to the present invention a viewfinder which is arranged in a conventional camera is arranged in an information terminal body, a subject can be correctly captured even though the display unit of the information terminal is not used as a viewfinder. Since the display unit is not powered on, it is advantageous that a power consumption can be reduced.

Further, according to the present invention, a shutter release button is located at a position similar to the position of a shutter release button of a conventional camera, operability equal to that of a conventional camera can be realized even in the portable information terminal, and camera shake in photographing or difficulty in performing the operation can be canceled. In addition, even though a shutter operation function is added to the terminal operation button (for example, posture without any excessive actions such as a change in holding state of the device and a motion or change in the positions of fingers.

Furthermore, according to the present invention, an image displayed on a display unit can also be checked by a subject person, when a camera function is operated. Images can be photographed on the basis of the demands from the subject person.

BRIEF DESCRIPTION OF THE DRAWINGS

FIG. 10A is a front view of a first example of the third embodiment. Display unit 1*c* is a finder for a subject person.

FIG. 10B is an unfolded view of the first example as shown in FIG. 10A.

DETAILED DESCRIPTION OF THE PREFERRED EMBODIMENTS

First Embodiment

Figure 1A:
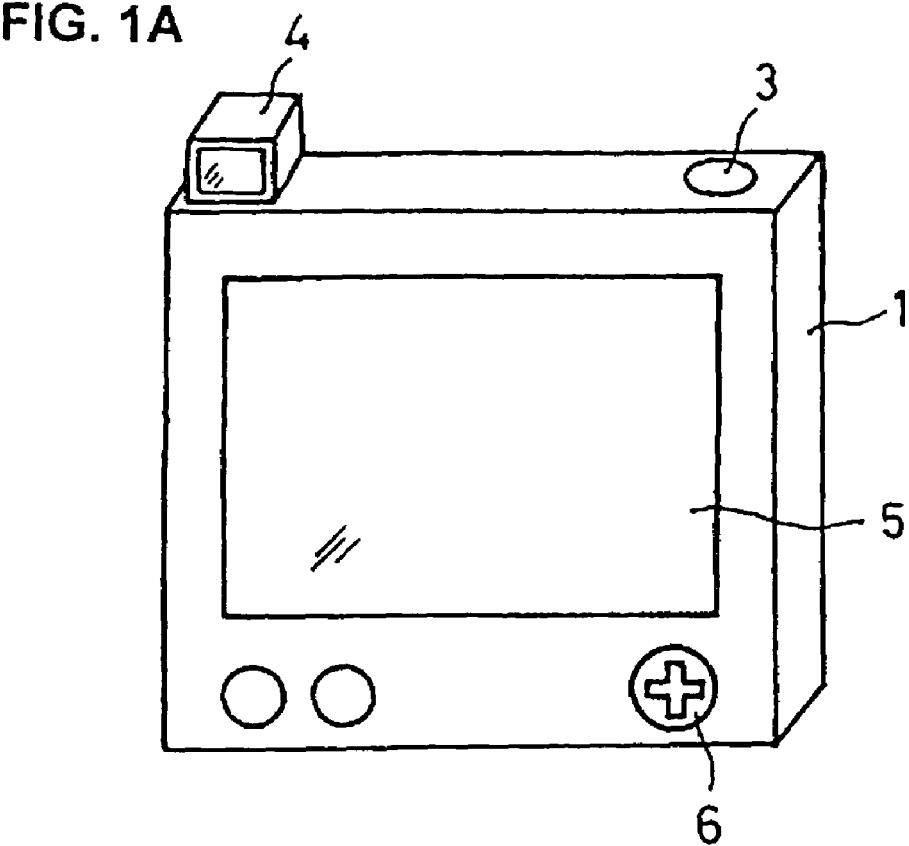
FIG. 1A is a rear view of a first example of the first embodiment. Viewfinder 4 may be retracted, when display unit is used as a finder.
Figure 1B:
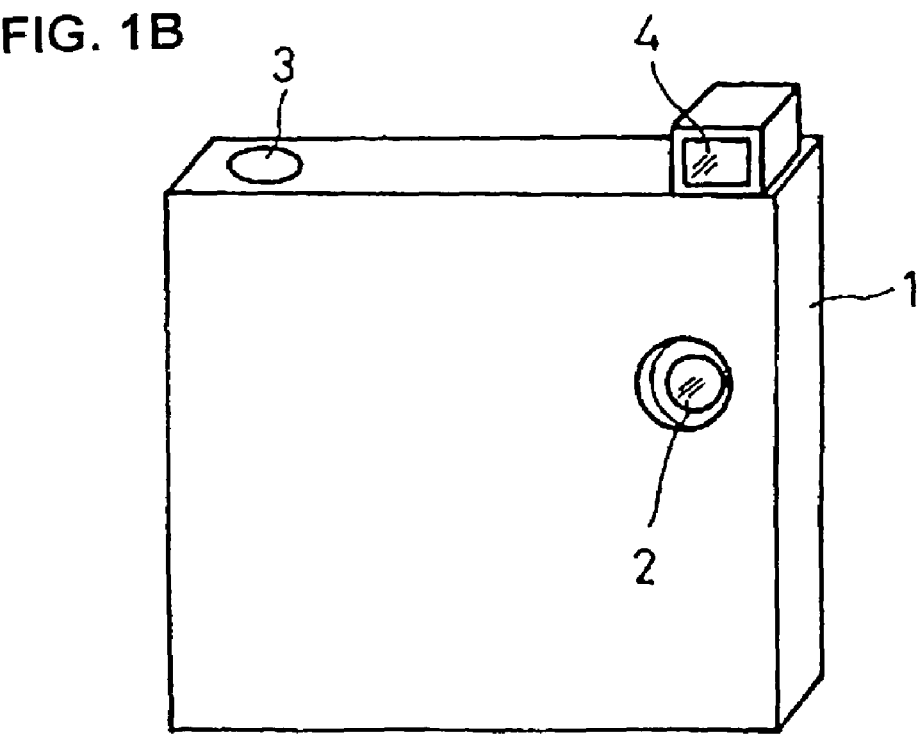
FIG. 1B is a front view of the first example of the first embodiment. Viewfinder 4 is extracted, when display unit 5 is not used as a finder.

In a first example of the first embodiment as shown in FIG. 1A, the information terminal body 1 is equipped with a camera function unit (not shown), and an operation button 3 for a shutter arranged in a photographing optical system 2 (optical lens system, electric eye photocell or the like) is arranged on a shoulder portion 1a (upper side) of a case of the information terminal body 1.

In particular, according to the present invention, a viewfinder 4 is arranged in the shoulder portion 1a in alignment with the operation button 3 to cause a user to peek in, for example, a direct image from an optical path of the optical system 2 such that the viewfinder can be retracted in the information terminal body 1. In FIG. 1A, reference numeral 5 denotes a display unit (liquid crystal screen) arranged on one surface of the information terminal body 1, and a terminal operation button 6 serving as a scroll button related to the display unit 5 is arranged beside the display unit 5.

The terminal operation button 6 is designed such that two operation functions are added by pressing the terminal operation button 6 in two steps independently of a tilting operation for a scroll operation (to be described later).

Figure 2A:
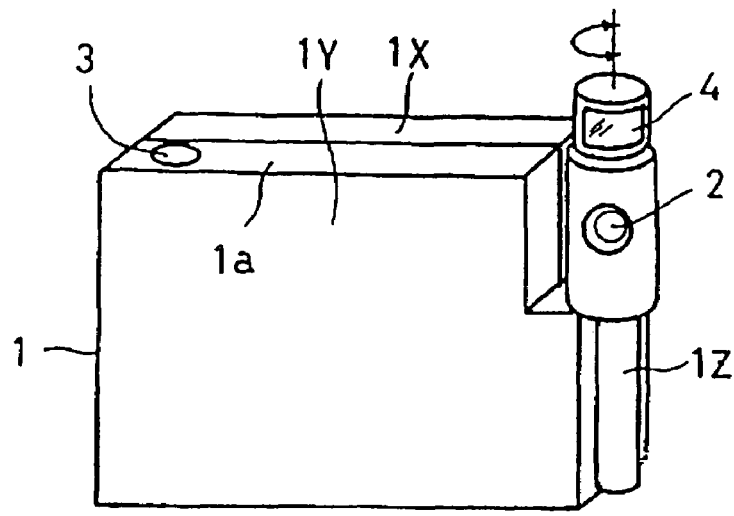
FIG. 2A is a front view of a second example of the first embodiment. Viewfinder 4 is extracted, when display unit is not used as a finder.
Figure 2B:
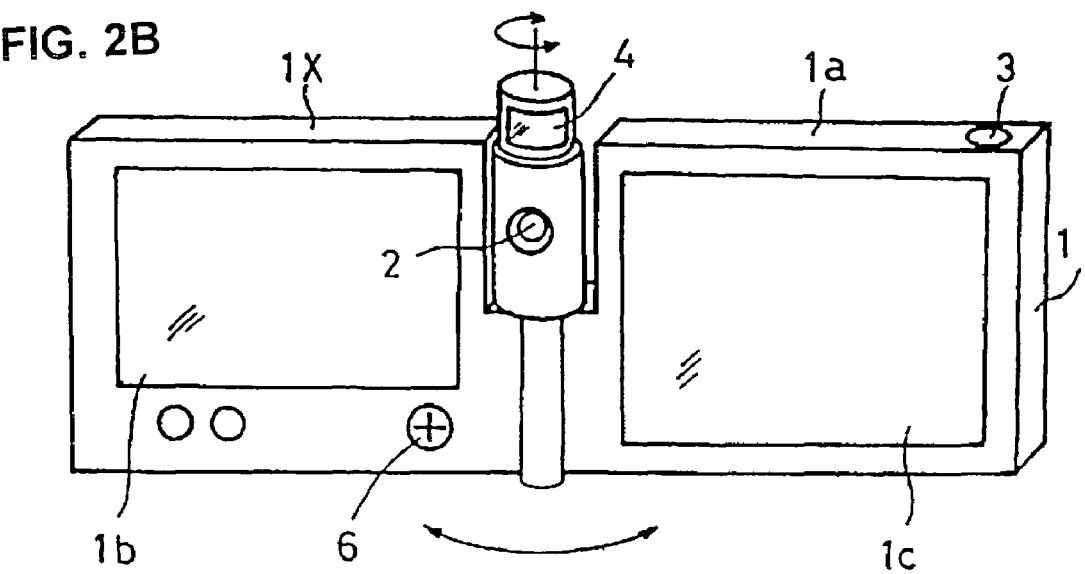
FIG. 2B is a front view during unfolding the apparatus of the second example of the first embodiment.
Figure 2C:
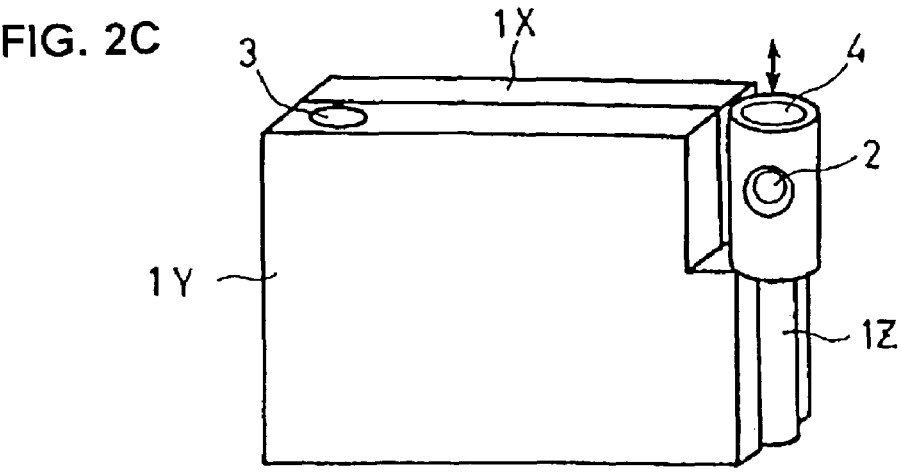
FIG. 2C is a front view of the second example of the first embodiment. Viewfinder 4 is retracted, when display unit 1*b* on flat case 1*x* is used as a finder.

The information terminal body 1 shown in FIGS. 2A, 2B and 2C is designed to foldably pivot a pair of flat cases 1X and 1Y at least one (two, in this example) of which has display units 1b and 1c through a hinge portion 1Z. A housing 7 equipped with the photographing optical system 2 (lens opening is shown outside) of the camera function unit is arranged on the hinge portion 1Z such that the housing 7 can be pivoted about the rotation center of the hinge portion 1Z.

Here, the viewfinder 4 is arranged in an optical system storage unit (large-diameter portion which can be rotated about the shaft) of the hinge portion 1Z such that the viewfinder can be retracted in the optical system storage unit.

Figure 3A:
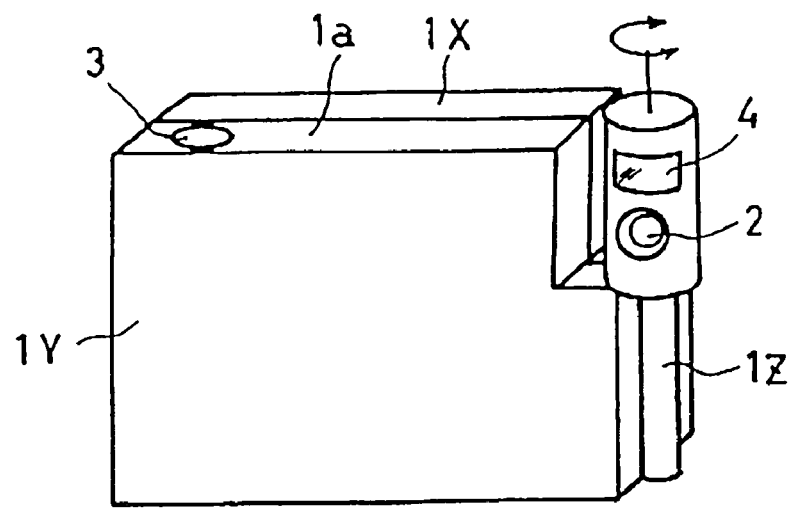
FIG. 3A is a front view of a third example of the first embodiment. Viewfinder 4 is fixed.
Figure 3B:
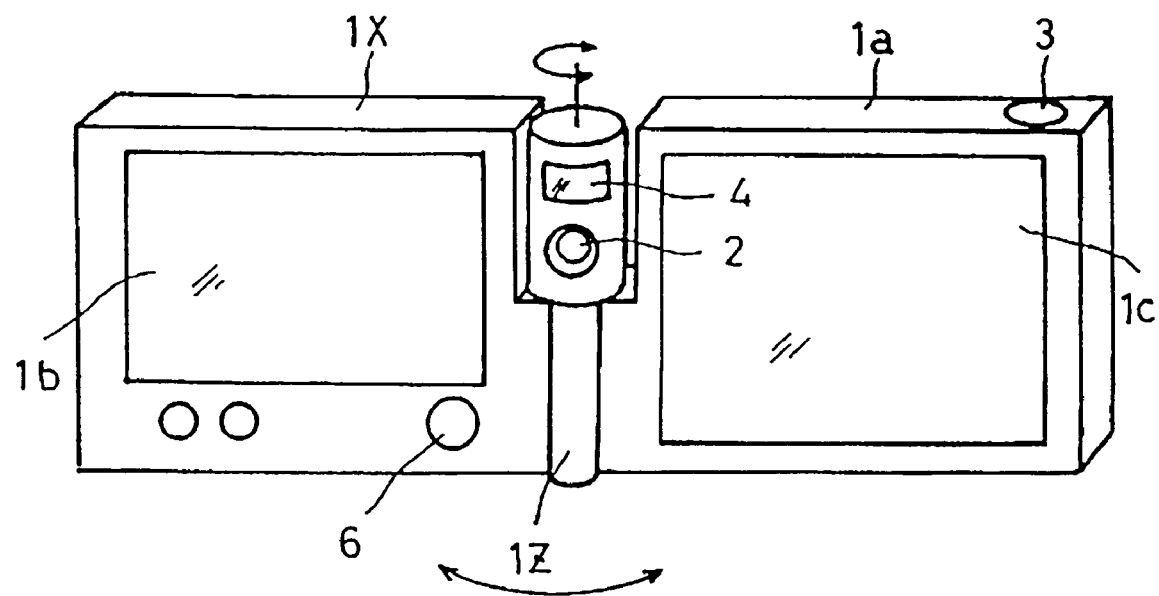
FIG. 3B is a front view during unfolding of the third example of the first embodiment.

In a third example as shown in FIGS. 3A and 3B, the viewfinder 4 is directly and fixedly arranged in the optical system storage unit.

Here, the positions of the shutter button 3 for the shutter and the viewfinder 4 are set at the positions shown in FIG. 2 or 3. However, the shutter button 3 and the viewfinder 4 may be located any positions where the shutter button 3 and the viewfinder 4 can be easily operated as buttons of a camera.

In these examples, each of the shutter button 3 (shutter release button) and the scroll button 6 has a button switch structure of a two-step pressing type. When each button is pressed in the first step, like a conventional camera, the camera function unit is activated to set the device in a photographing preparation stage. When the button is pressed in the second step, the shutter is released.

Figure 4:
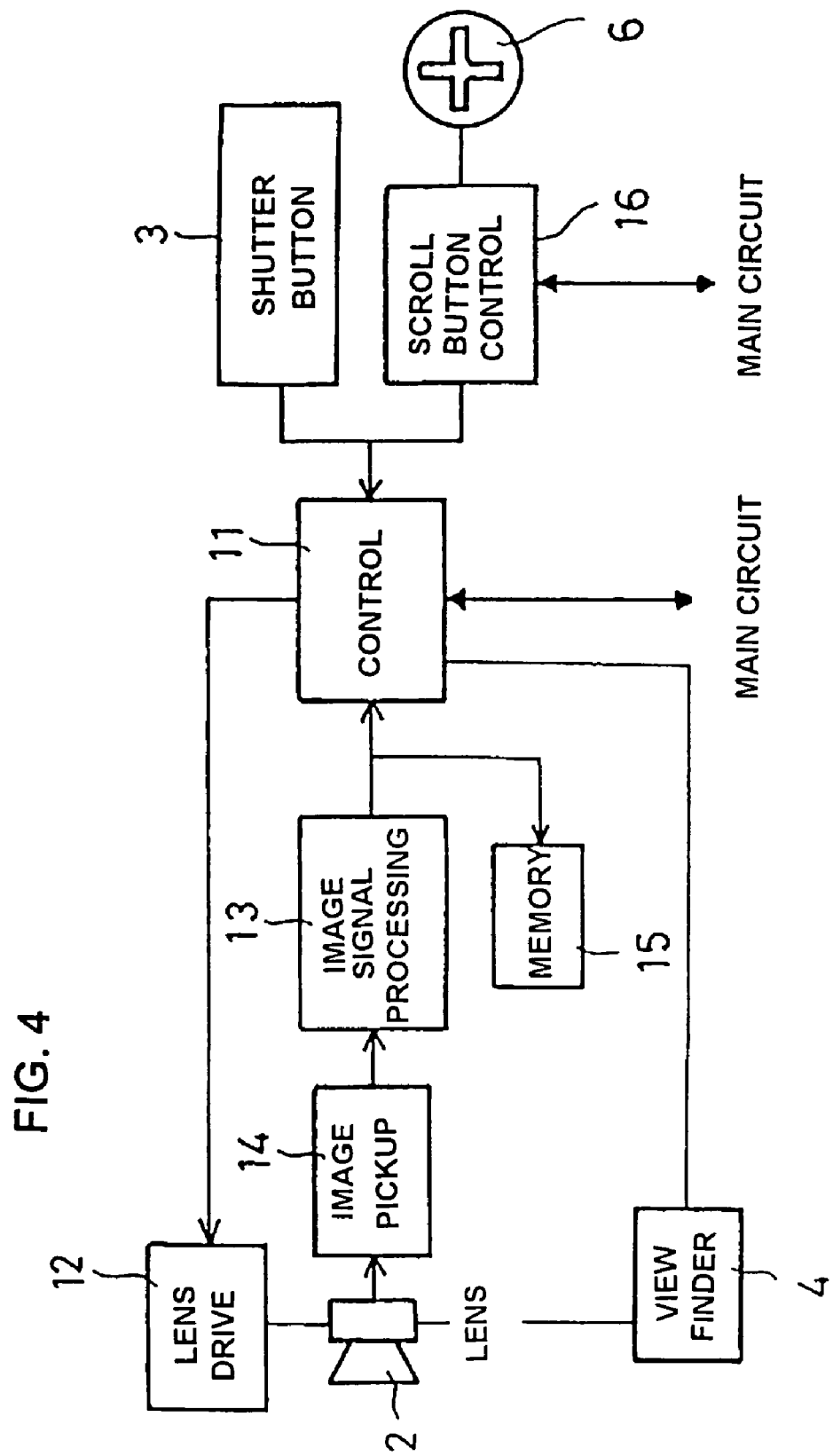
FIG. 4 is a block diagram showing the configuration of the first embodiment.

In this case, when the shutter button 3 or the scroll button 6 is pressed down by one step, as shown in FIG. 4, a control circuit 11 controls a lens drive unit 12 to adjust a focal point and an exposure of the photographing optical system 2 (optical lens system), and the control circuit 11 controls an image signal processing circuit 13 and a photographing circuit 14 to perform such an adjustment that a proper image can be photographed and completes preparation for photographing.

When the shutter button 3 or the scroll button 6 is pressed down by two steps, the signal is input to the control circuit 11, and the shutter (not shown) of the photographing optical system 2 is released. Image information focused by the photographing circuit 14 is converted into digital image data by the image signal processing circuit 13 to be stored in a memory 15.

In this case, the control circuit 11 is connected to a main circuit of the portable information terminal. Digital image data stored in the memory 15 is transferred to the main circuit through the control circuit 11. In this case, an image may be displayed on the display unit 1b.

In the portable information terminals having the configurations shown in FIGS. 2 and 3, the following configuration may be used. That is, for example, the case 1Y is developed at 360° with respect to the case 1X, image display is performed on the display unit 1b as a viewfinder. The display unit 1c is caused to face a subject side, and the same screen display is performed on the display unit 1c, so that the image (so-called camera angle) as a subject can be watched from the subject side.

Figure 5A:
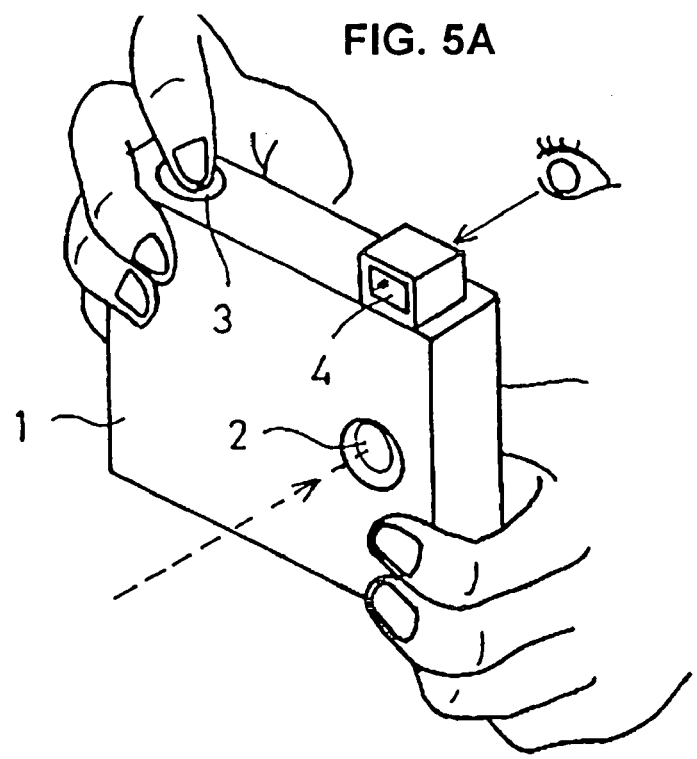
FIG. 5A is an illustration how to take a picture, by using a viewfinder 4 and a shutter 3.
Figure 5B:
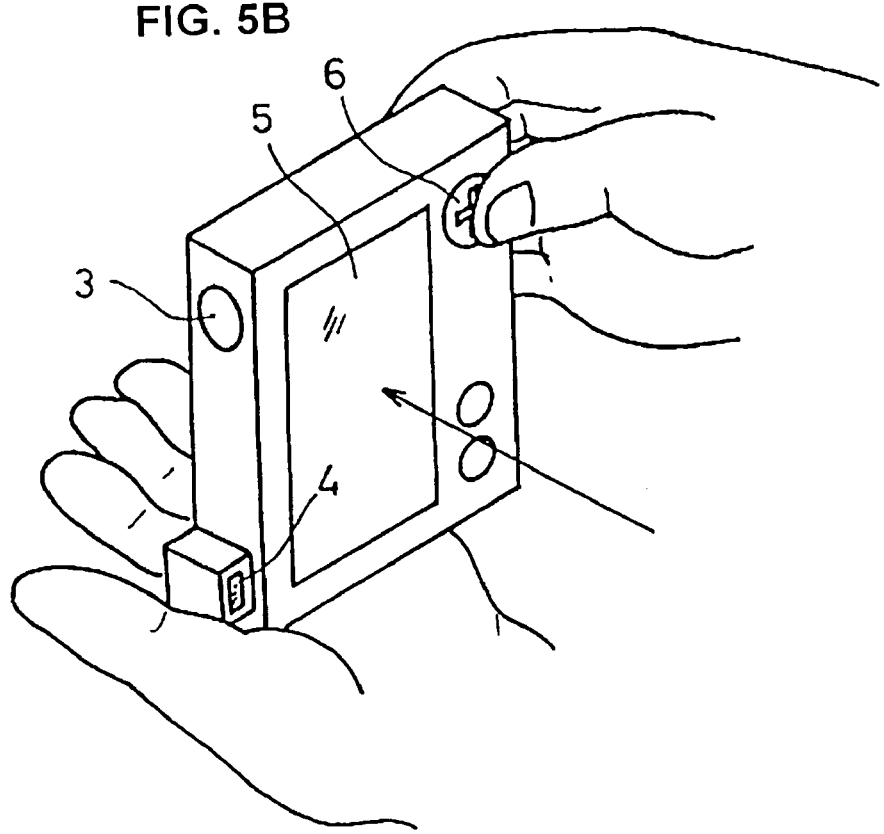
FIG. 5B is an illustration how to take a picture, by using a display unit 5 and a scroll button 6 as a shutter.

In this configuration, when photographing is performed with a vertically long or horizontally long screen as a camera by changing the holding state of the terminal body 1 (see FIGS. 5A and 5B), it is advantageous that the shutter button 3 serving as a shutter release button and the scroll button 6 are easily selectively operated even if a user peeks in the viewfinder 4 or even if the user watches the display unit 5 (or 1c).

In this example, the scroll button 6 is designed to be used in not only a shutter operation function (press down) but also a screen scroll operation or a menu selection operation which is an original function. For this reason, the scroll button 6 is connected to the control circuit 11 and also connected to the main circuit of the portable information terminal. In the portable information terminal, in order to make it possible to also set the function when the scroll button 4 is vertically pressed down in a function except for the shutter operation function, a scroll button control circuit 16 which can perform an operation such as a function mode switching operation may be arranged. However, when the function when the scroll button is vertically pressed down is set in only the shutter operation function, the scroll button control circuit 16 may be omitted.

The portable information terminal can achieve the function of a television telephone or the like which is the original function. For example, in the case of the configuration shown in FIGS. 2 and 3, in the folded state shown in FIG. 2A or 3A, only a reception state (which can also be actively turned off by the switching operation) and a camera function are set. The function of the information terminal is set such that a reception signal of the information terminal can be notified by generating a predetermined sound, and the shutter operation of the camera function unit is performed by a pressing operation of the shutter button 3.

In this case, a user arbitrary selects whether the display unit 1b is used as a viewfinder or the viewfinder 4 is directly used. A switching operation for this selection may be performed by a switch (not shown) arranged on the terminal body. When the viewfinder 4 is directly used, the screen display (output display as the function of the viewfinder) of the display unit 1b is stopped, unnecessary power is prevented from being consumed.

As shown in FIGS. 2B and 3B, in a developed state of the cases 1X and 1Y (for example, a mode turnover switch function for converting the mode from a camera function mode to an information terminal function mode is achieved), functions (switching function to a transmission/reception state, function for turning on the display units 1b and 1c, and the like) of the information terminal are set.

Here, a function switch such as a keyboard display is displayed on a part of the display unit 1b, while a call is made by the scroll button 6.

In this state, the transmission and reception of sound can be realized, and the camera function unit is operated to continuously or intermittently photograph the image of a user herself/himself through the photographing optical system 2. For example, an image is displayed on a part of the display unit 1b, and an image signal is digitized and then it is transmitted to a person on the opposite end of line. An image of the person on the opposite end of line is also displayed on the display unit 1c.

On the demand of the called person or calling person, the camera function is achieved by using the photographing optical system 2, and the image can also be immediately transmitted to the other end. Such a mode switching operation may be performed by a function switch displayed on a part of the display unit 1b or the like.

In the portable information terminal with camera according to the present invention, when the camera function is mainly operated, even if the display unit 1b of the portable information terminal is powered on to be used as a viewfinder, the viewfinder 4 which is independently arranged can be used in correspondence with the photographing optical system 2 of the camera function unit. For this reason, a power for powering the display unit 1b can be prevented from being consumed.

In these examples, the vertical press switch function set in the scroll button 6 can also be used in a function except for the shutter operation button (multiple function) to the taste of a user.

Second Embodiment

Figure 6:
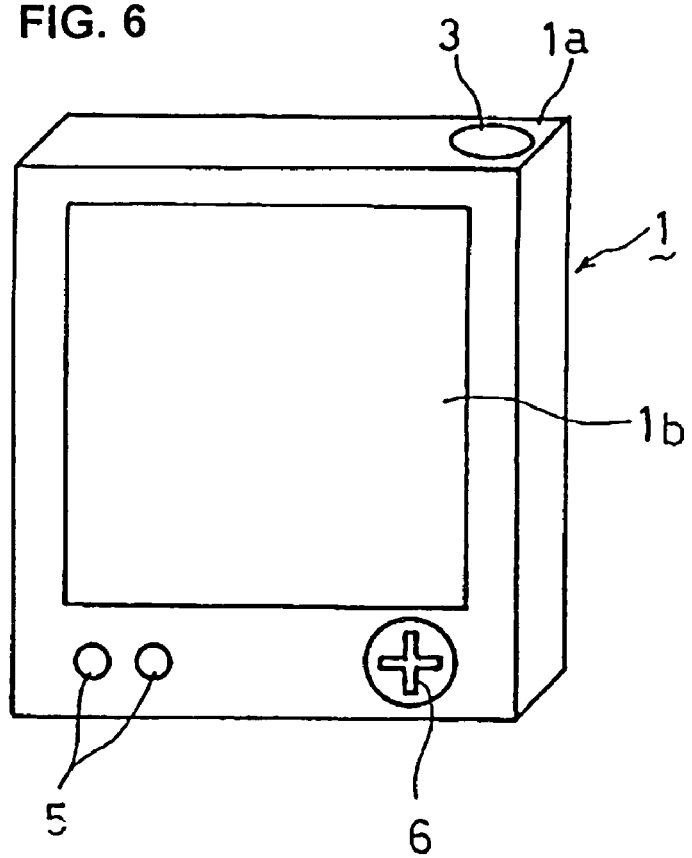
FIG. 6 is a rear view of a first example of the second embodiment. Display unit 1*b* is used as a finder, while scroll button 6 also functions as a shutter button.
Figure 7:
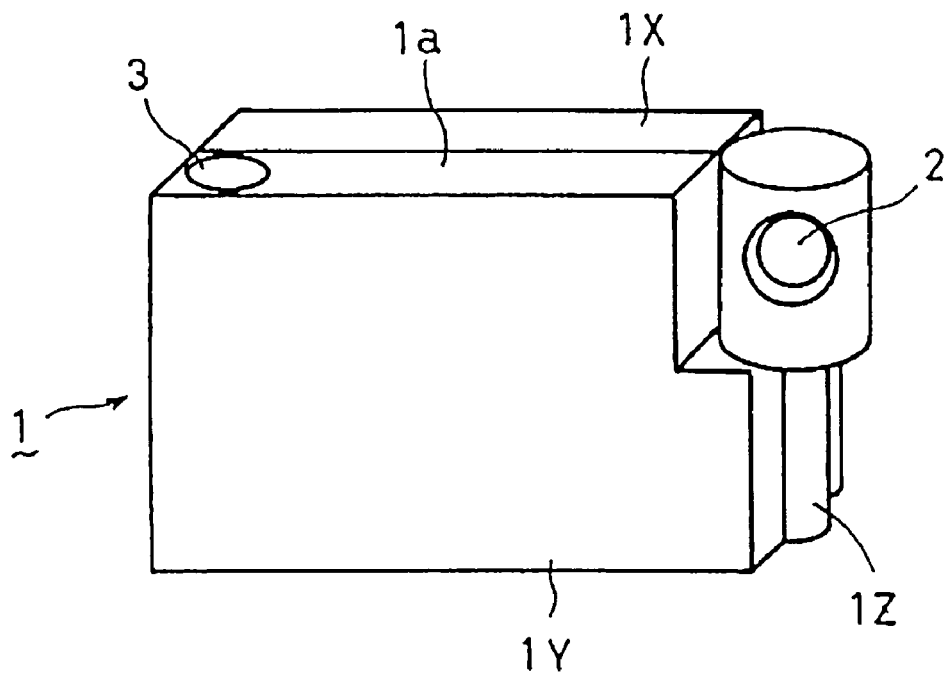
FIG. 7 is a front view schematic perspective view showing a second example of the second embodiment. Shutter button 3 is placed as conventional optical cameras.
Figure 8:
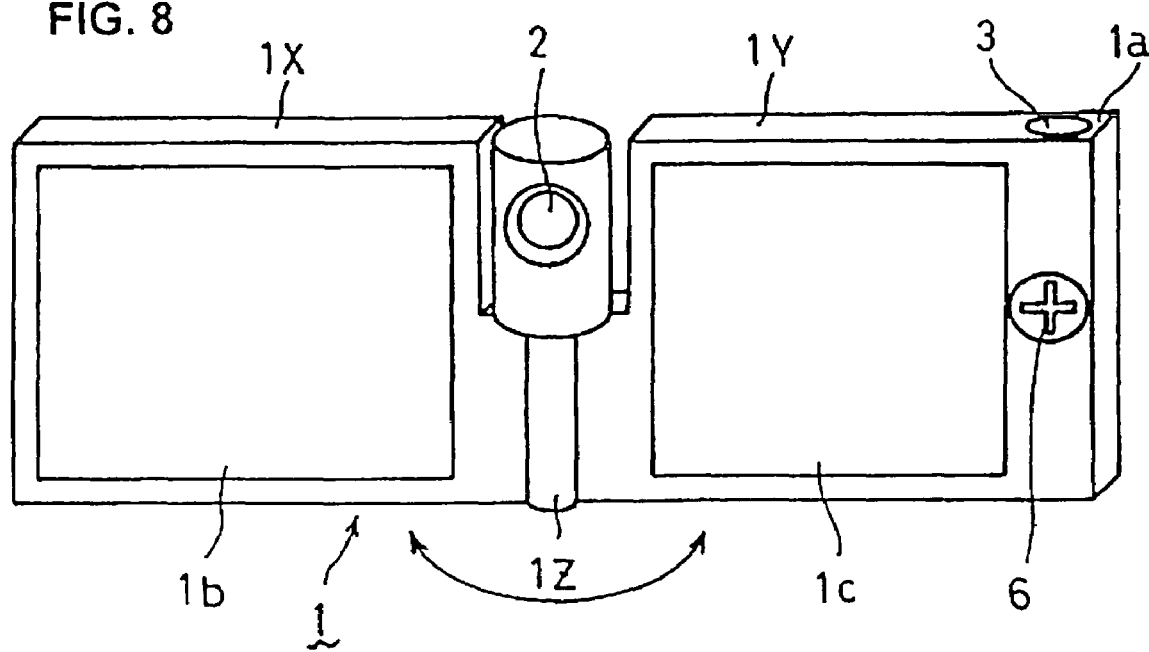
FIG. 8 is an unfolded view of the second example as shown in FIG. 7.

The outlines of two examples of the second embodiment are shown in FIGS. 6, 7, and 8. In the first example as shown in FIG. 6, an information terminal body 1 is equipped with a camera function unit (not shown), an shutter operation button 3 for a shutter arranged in a photographing optical system 2 (optical lens system, electric eye photocell, and the like) is arranged on a shoulder portion 1a (located on a surface perpendicular to a surface having a display unit to be described later) of a case of the information terminal body 1.

In particular, the same function as that of the shutter operation button 3 for the shutter is set in one function operation of a terminal operation button 6 arranged on the information terminal body 1, so that the terminal operation button 6 and the shutter operation button 3 can be used by switching. In this example, the terminal operation button 6 is a scroll button related to the display unit 1b of the information terminal body 1. This scroll button has not only a scroll function obtained by a normal tilting operation but also a vertical pressing function, and the function is caused to correspond to the function of the shutter operation button 3 for the shutter (the terminal operation button 6 and the shutter operation button 3 have the same functions).

The second example of information terminal body 1 as shown in FIGS. 7 and 8 is designed to foldably pivot a pair of flat cases 1Y and 1Y at least one (two, in this example) of which has display units 1c and 1d through a hinge portion 1Z. The hinge portion 1Z is equipped with the photographing optical system 2 of the camera function unit. The characteristic feature of the present invention is the same as that of the configuration shown in FIG. 6.

Here, the positions of the shutter operation button 3 for the shutter and the scroll button 6 are set at the positions shown in FIG. 8.

However, the shutter operation button 3 and the scroll button 4 may be located at any positions. The shutter operation button 3 may be located at a position where the information terminal is easily operated as a camera, and the scroll button 6 may be located at a position where the scroll button is is easily operated as the shutter release button of the camera and is easily operated as the operation button of the portable information terminal.

Each of the shutter operation button 3 (shutter release button) and the scroll button 6 has a button switch structure of a two-step pressing type. As for the former, when each button is pressed in the first step, like a conventional camera, the camera function unit is activated to set the device in a photographing preparation stage. When the button is pressed in the second step, the shutter is released.

Figure 9:
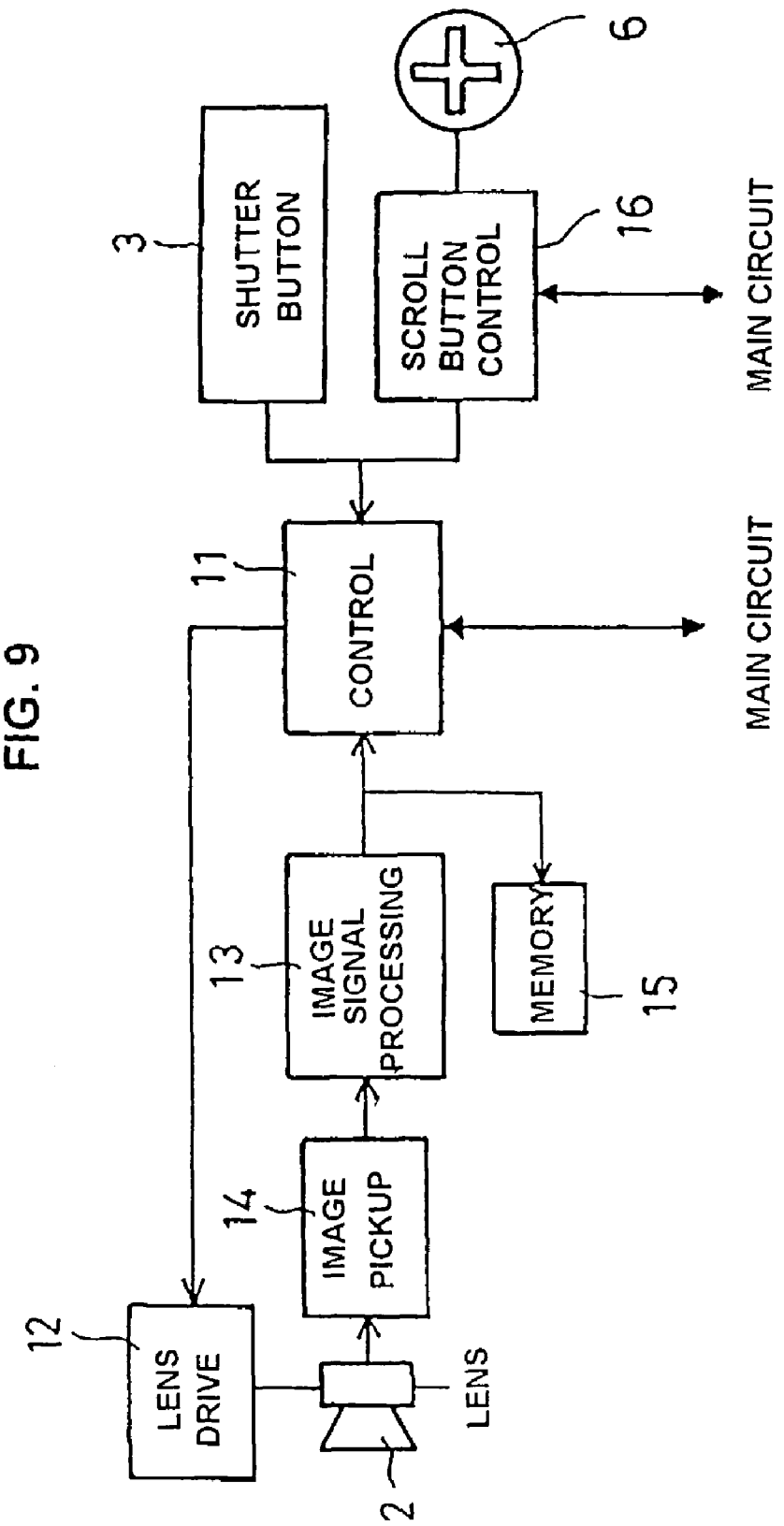
FIG. 9 is a block diagram showing the configuration of the second embodiment.

In this case, when the shutter operation button 3 or the scroll button 6 is pressed down by one step, as shown in FIG. 9, a control circuit 11 comprising of a CPU and the like controls a lens drive unit 12 to adjust a focal point and an exposure of the photographing optical system 2 (optical lens system), and the control circuit 11 controls an image signal processing circuit 13 and a image-pickup circuit 14 to perform such an adjustment that a proper image can be photographed and completes preparation for photographing.

When the shutter operation button 3 or the scroll button 6 is pressed down by two steps, the signal is input to the control circuit 11, and the shutter (not shown) of the photographing optical system 2 is released. Image information focused by the image-pickup circuit 14 is converted into digital image data by the image signal processing circuit 13 to be stored in a memory 15.

n this case, the control circuit 11 is connected to a main circuit of the portable information terminal. Digital image data stored in the memory 15 is transferred to the main circuit through the control circuit 11. In this case, an image may be displayed on the display unit 1b.

In the portable information terminals having the configurations shown in FIGS. 7 and 8, the following configuration may be used. That is, for example, the case 1Y is developed at 360° with respect to the case 1X, image display is performed on the display unit 1b as a viewfinder. The display unit 1c is caused to face a subject side, and the same screen display is performed on the display unit 1c, so that the image (so-called camera angle) as a subject can also be watched from the subject (person to be photographed) side. In this manner, the image of the person to be photographed can be checked.

In this example, the scroll button 6 is designed to be used in not only a shutter operation function (press down) but also a screen scroll operation or a menu selection operation which is an original function. For this reason, the scroll button 6 is connected to the control circuit 11 and also connected to the main circuit of the portable information terminal. In the portable information terminal, in order to make it possible to also set the function when the scroll button 4 is vertically pressed down in a function except for the shutter operation function, a scroll button control circuit 16 which can perform an operation such as a function mode switching operation may be arranged. However, when the function when the scroll button is vertically pressed down is set in only the shutter operation function, the scroll button control circuit 16 may be omitted.

In this example, the scroll button 6 is designed to be used in not only a shutter operation function (press down) but also a screen scroll operation or a menu selection operation which is an original function. For this reason, the scroll button 6 is connected to the control circuit 11 and also connected to the main circuit of the portable information terminal. In the portable information terminal, in order to make it possible to also set the function when the scroll button 6 is vertically pressed down in a function except for the shutter operation function, a scroll button control circuit 16 which can perform an operation such as a function mode switching operation may be arranged. However, when the function when the scroll button is vertically pressed down is set in only the shutter operation function, the scroll button control circuit 16 may be omitted.

The portable information terminal can achieve the function of a television telephone or the like which is the original function. For example, in the case of the configuration shown in FIGS. 7 and 8, in the folded state shown in FIG. 7, only a reception state (which can also be actively turned off by the switching operation) and a camera function are set. The function of the information terminal is set such that a reception signal can be notified by generating a predetermined sound, and the shutter operation of the camera function unit is performed by a pressing operation of the operation button 3.

As shown in FIG. 8, in a developed state of the cases 1X and 1Y (for example, a mode turnover switch function for converting the mode from a camera function mode to an information terminal function mode is achieved), functions (switching function to a transmission/reception state, function for turning on the display units 1b and 1c, and the like) of the information terminal are set.

Here, for example, a function switch such as a keyboard display is displayed on a part of the display unit 1b, while a call is made by using scroll button.

In this state, the transmission and reception of sound can be realized, and the camera function unit is operated to continuously or intermittently photograph the image of a user herself/himself through the photographing optical system 2. For example, an image is displayed on a part of the display unit 1b, and an image signal is digitized and then transmitted to a person on the other end of line. An image of the person on the other end of line can also be displayed on the display unit 1c.

On the demand of a calling person or a called person, the photographing optical system 2 is activated, and the image can also be immediately transmitted to the other end. Such a mode switching operation may be performed by a function switch serving as a touch sensor displayed on a part of the display unit 1b or the like.

In the portable information terminal with camera according to the present invention, even though the camera function is mainly operated, or when the original function of the portable information terminal is mainly used, an advantage that a button (for example, scroll button) operated by a user is used as an operation button for a shutter operation can be achieved. In addition, the vertically pressing switching function set in the scroll button can also be used in a function except for the shutter operation button (multiple function) to the taste of a user.

In many conventional portable information terminals with camera, shutter release buttons are independent of other buttons. Therefore, when a user wants to photograph a subject with the camera while a scroll button is being operated, the user changes the holding state of the device body or the user must separate her/his finger from the scroll button and move the finger to the operation button for the shutter. Furthermore, when a photographing operation is performed with a vertically long screen or a horizontally long screen, the same actions as described above must be performed to change the position of the camera.

Although a shutter operation function is added to the scroll button serving as a terminal operation button, a shutter operation can also be realized without using the scroll button. The shutter operation can also be achieved by operating a plurality of buttons 5 as shown in FIG. 6.

Third Embodiment

First Example

In this example, the information terminal body 1 is designed such that, as shown in FIGS. 10A, 10B, a pair of flat cases 1X and 1Y having display units 1b and 1c are foldably pivoted through a hinge portion 1Z, and the hinge portion 1Z is equipped with a photographing optical system 2 (lens opening is shown outside) for the camera function unit. One case 1X is equipped with a terminal operation button 6 as a scroll button for a screen of the display unit 1b, and the terminal operation button 6 is aligned to another terminal operation button 5. The terminal operation button 5 is designed (to be described later) such that not only a tilting operation for a scroll operation in a normal state but also two operation functions obtained by pressing the button in two steps.

In particular, here, the cases 1X and 1Y have the display units on the outside surfaces such that the display units 1b and 1c face outside (the display units 1b and 1c are back to back on the opposite side) in a folded state. The hinge portion 1Z is designed to pivot a hinge portion 1d arranged on the case 1X and a hinge portion 1e arranged on the case 1Y with respect to the axial center (not shown) of a housing which accommodates the optical system 2 therein.

Here, the position of the operation button 3 for the shutter is located at the shoulder portion 1a shown in FIG. 10. However, the information terminal body 1 may be arranged at any position where the portable information terminal can be easily operated.

In these examples, each of the shutter operation button 3 (shutter release button) and the scroll button 6 has a button switch structure of a two-step pressing type. When each button is pressed in the first step, like a conventional camera, the camera function unit is activated to set the device in a photographing preparation stage. When the button is pressed in the second step, the shutter is released.

Figure 12:
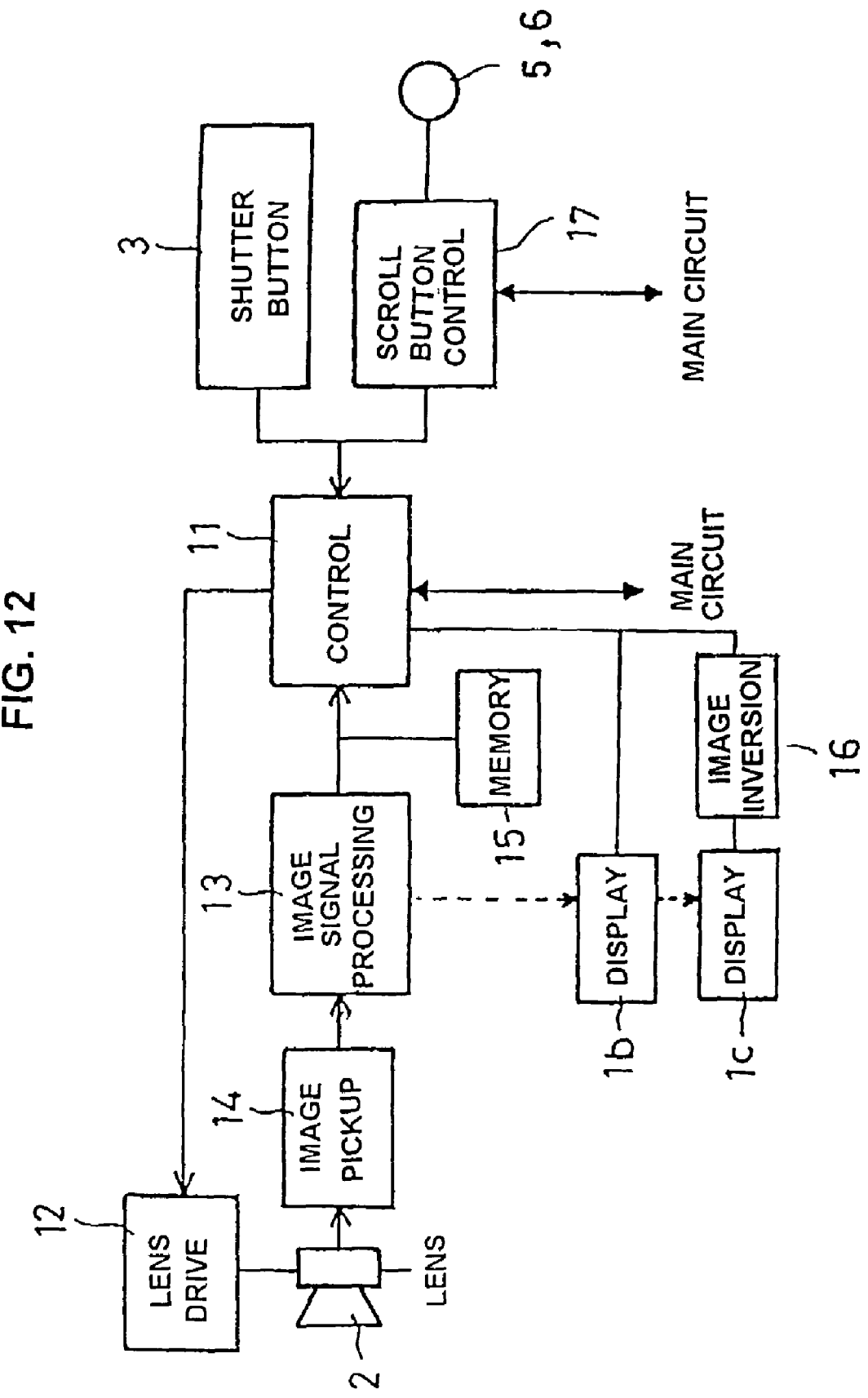
FIG. 12 is a block diagram showing the configuration of the third embodiment.

In this case, in the state in FIG. 10A (folded state), when the shutter operation button 3 or the scroll button 6 is pressed down by one step, as shown in FIG. 12, a control circuit 11 controls a lens drive unit 12 to adjust a focal point and an exposure of the photographing optical system 2 (optical lens system), and the control circuit 11 controls an image signal processing circuit 13 and a photographing circuit 14 to perform such an adjustment that a proper image can be photographed and completes preparation for photographing.

When the shutter operation button 3 or the scroll button 6 is pressed down by two steps, the signal is input to the control circuit 11, and the shutter (not shown) of the photographing optical system 2 is released. Image information focused by the photographing circuit 14 is converted into digital image data by the image signal processing circuit 13 to be stored in a memory 15.

In this case, the control circuit 11 is connected to a main circuit of the portable information terminal. Digital image data stored in the memory 15 is transferred to the main circuit through the control circuit 11. In this case, the image of a subject is displayed on the display unit 1b in place of a viewfinder.

Here, Images are displayed on the display unit 1b as a finder, and the display unit 1c is caused to face the subject. The same image is displayed on the display unit 1c, so that an image (so-called camera angle) which is a subject can be viewed from the subject side. In this case, a horizontally inverted image (for example, this is obtained by operating a line memory as so-called First in last out) of the photographed image may be displayed on the display unit 1c facing the subject side. For this reason, the portable information terminal may have a selectable and switchable configuration (not shown) such as switching means for a normal image such that an inverted image is displayed through image inversion means 16.

In this example, the scroll button 6 is designed to be used in not only a shutter operation function (press down) but also a screen scroll operation or a menu selection operation which is an original function. For this reason, the scroll button 6 is connected to the control circuit 11 and also connected to the main circuit of the portable information terminal. In the portable information terminal, in order to make it possible to also set the function when the scroll button 6 is vertically pressed down in a function except for the shutter operation function, a scroll button control circuit 17 which can perform an operation such as a function mode switching operation may be arranged. However, when the function when the scroll button is vertically pressed down is set in only the shutter operation function, the scroll button control circuit 17 may be omitted.

The portable information terminal can achieve the function of a television telephone or the like which is the original function. For example, in the folded state shown in FIG. 10A, only a reception state (which can also be actively turned off by the switching operation) and a camera function are set. The function of the information terminal is set such that a reception signal of the information terminal can be notified by generating a predetermined sound, and the shutter operation of the camera function unit is performed by a pressing operation of the shutter operation button 3. In this case, the display unit 1b is used as a finder.

As shown in FIG. 10B, in a developed state of the cases 1X and 1Y (for example, a mode turnover switch function for converting the mode from a camera function mode to an information terminal function mode is achieved), functions (switching function to a transmission/reception state, function for turning on the display units 1b and 1c, and the like) of the information terminal are set.

Here, for example, a function switch such as a keyboard display is displayed on a part of the display unit 1b, while the scroll button 6 is operated to make a call.

In this state, the transmission and reception of sound can be realized, and the camera function unit is operated to continuously or intermittently photograph the image of a user herself/himself through the photographing optical system 2. For example, an image is displayed on a part of the display unit 1b, and an image signal is digitized and then transmitted to a person on the other end of line, or radio communication channel. An image of the person on the other end can also be displayed on the display unit 1c.

In a communication process, on the demand from the calling side or called side, the camera function is achieved for a subject on the other side, a desired photographing operation is performed by using the photographing optical system 2, and the image can also be immediately transmitted from one end to the other end. Such a mode switching operation may be performed by a function switch displayed on a part of the display unit 1b or the like. In this case, as shown in FIG. 10A and FIG. 11C, when the display unit 1c is caused to face a subject to perform a photographing operation, for example, so that the shutter can be released after a user causes a person (person to be photographed), which is a subject, to check the image. The photographing operation can be performed at a preferable camera angle, and the image can be transmitted.

In the portable information terminal with camera, when the camera function is mainly operated, an image to be photographed can be checked, and an image on which the intention, e.g., a camera angle or the like, of a person to be photographed is reflected can be received.

Second Example

In this example, a hinge portion 1Z has a structure in which cases 1X and 1Y are pivoted by parallel shafts 1f and 1g (indicated by dotted lines) with respect to a housing 6 equipped with a photographing optical system 2. As the folded states, two states can be selected such that display units 1b and 1c face outside and inside the device.

Figure 11A:
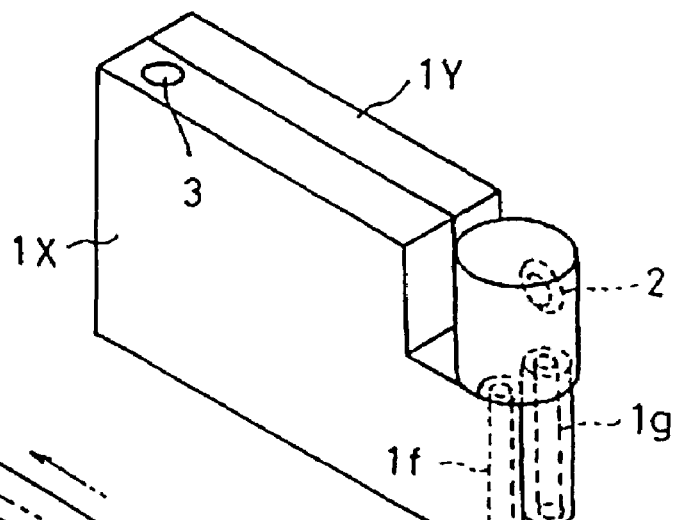
FIG. 11A is a rear view of a second example of the third embodiment. Shutter button 3 is placed as conventional optical cameras.
Figure 11B:
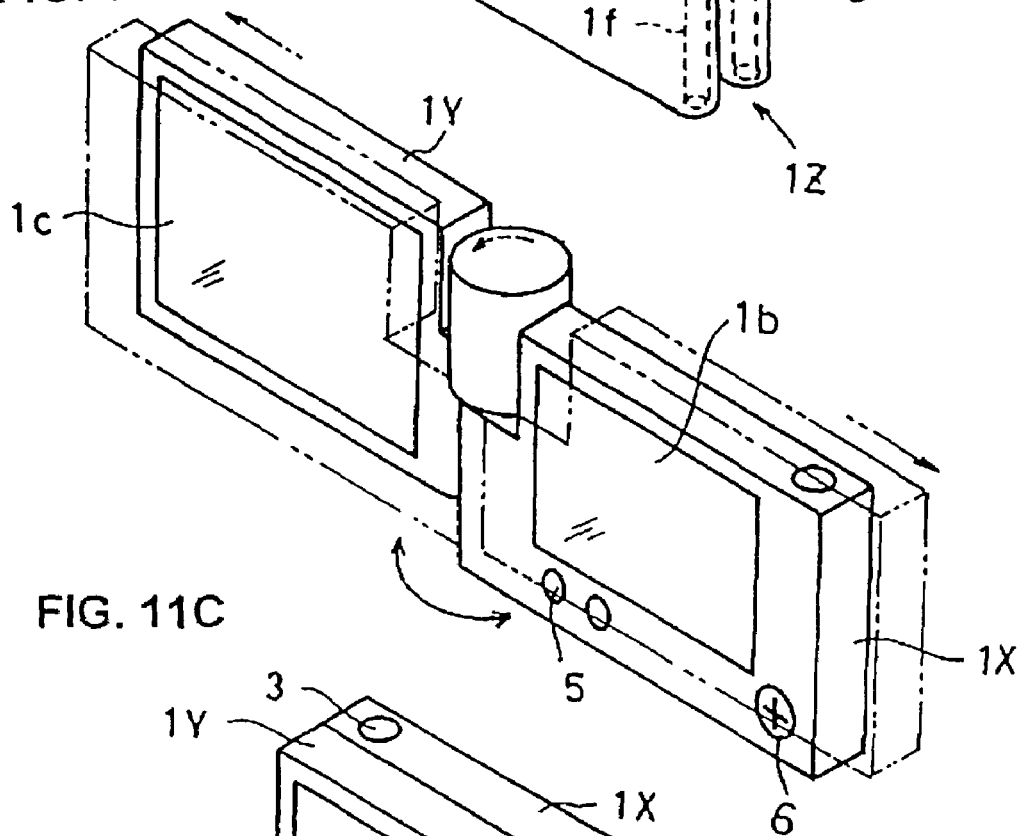
FIG. 11B is an unfolded view of the second example as shown in FIG. 11A.
Figure 11C:
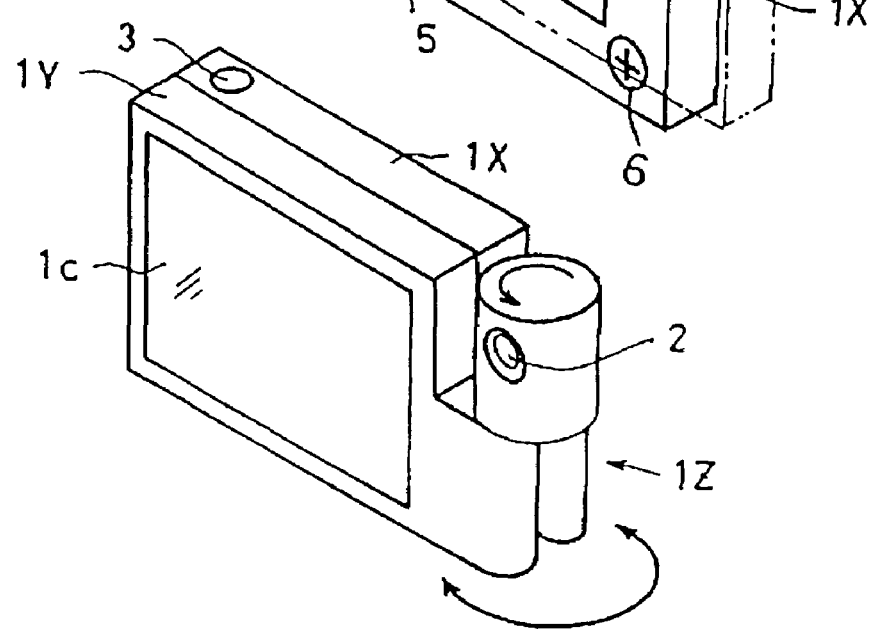
FIG. 11C is a front view of the second example of the third embodiment. Display unit 1c is a finder for a subject person.

More specifically, when the portable information terminal is not used, as shown in FIG. 11A, the device is designed such that the display units 1b and 1c are opposite to each other and are not exposed to the outside. As shown in FIG. 11B, when the portable information terminal is used as an information terminal, one case 1X is developed at 180° about the parallel shaft 1f with respect to the other case 1Y (state indicated by a solid line), or, furthermore, when the cases 1X and 1Y are horizontally drawn as indicated by a straight arrow to rotate the housing 6 at 90° about an intermediate point between the parallel shafts 1f and 1g (state indicated by an imaginary line). In this state, as in the first example, for example, the portable information terminal can be used as a television telephone.

In particular, in this example, when the cases 1x and 1Y are pivoted by the two parallel shafts 1f and 1g the housing 6 is more rotated at 90° (rotated at 180° from the state shown in FIG. 11A) from the state shown in FIG. 11a through the state shown in FIG. 11b. In addition, the case 1Y is rotated at 180° about the parallel shaft 1g (i.e., rotated at 360° as a whole), so that the display units 1b and 1c can be made opposite to each other as shown in FIG. 11C. Therefore, the image of a subject can be displayed on the display unit 1b as a viewfinder, and the same image or a horizontally inverted image can be displayed to be opposite to the display unit 1b used as a finder on the opposite side can be displayed on the display unit 1c facing the subject. For this reason, a photographing operation can be performed with an image on which a demand, related to a camera angle, of a person to be photographed is reflected.

In these examples, the vertical press switch function set in the scroll button 6 can also be used in a function except for the shutter operation button (multiple function) to the taste of a user. In addition, the following method of using the portable information terminal can be achieved. That is, the camera function is operated when the cases are developed at 180°, a live image serving as a viewfinder is displayed on one display unit, and the image which is previously photographed is displayed.

What is claimed is:

1. A portable information terminal which comprises:
    a camera unit;
    a housing for said camera; and
    a pair of flat cases which pivots through a hinge,
    wherein:
    each of said cases is equipped with a display unit for displaying information from transmission channels or image taken in by said camera;
    said hinge is equipped with said housing;
    an optical axis of lens of said camera is perpendicular to an axis of said hinge; and
    said hinge has a structure in which said cases are pivoted by two shafts parallel to the axis of said housing; and said display units face inside said information terminal body in a folded state and they face outside said information terminal in an unfolded state.

2. The portable information terminal according to claim 1, wherein one of said display units faces a subject and displays a mirror image of an image as taken in by said camera.

3. A portable information terminal according to claim 1, wherein said display units are positioned such that the cases are opposite to each other when said display units are folded, while they face the same side when said display units are unfolded at 180°.

4. The portable information terminal according to claim 1, wherein said housing is rotated by 360° so as to locate said display units inside or outside said information terminal in a folded state, while said housing is rotated so as to locate said display units on the same side in an unfolded state.

* * * * *

UNITED STATES PATENT AND TRADEMARK OFFICE
CERTIFICATE OF CORRECTION

PATENT NO. : 7,626,630 B2    Page 1 of 1
APPLICATION NO. : 11/338769
DATED : December 1, 2009
INVENTOR(S) : Nishino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Twenty-first Day of December, 2010

David J. Kappos
*Director of the United States Patent and Trademark Office*